United States Patent
Guzman et al.

(10) Patent No.: US 8,573,040 B2
(45) Date of Patent: Nov. 5, 2013

(54) METHOD FOR DETERMINING AIR FILTER CONDITION

(75) Inventors: Peter P. Guzman, Marcellus, NY (US); John R. Reason, Liverpool, NY (US); Nader S. Awwad, Baldwinsville, NY (US); John T. Steele, Marcellus, NY (US)

(73) Assignee: Carrier Corporation, Farmington, CT (US)

( * ) Notice: Subject to any disclaimer, the term of this patent is extended or adjusted under 35 U.S.C. 154(b) by 318 days.

(21) Appl. No.: 12/921,270

(22) PCT Filed: Apr. 23, 2009

(86) PCT No.: PCT/US2009/041529
§ 371 (c)(1),
(2), (4) Date: Dec. 13, 2010

(87) PCT Pub. No.: WO2009/132182
PCT Pub. Date: Oct. 29, 2009

(65) Prior Publication Data
US 2011/0094297 A1    Apr. 28, 2011

Related U.S. Application Data

(60) Provisional application No. 61/047,241, filed on Apr. 23, 2008, provisional application No. 61/052,660, filed on May 13, 2008.

(51) Int. Cl.
*G01M 15/04* (2006.01)
(52) U.S. Cl.
USPC ..................................... 73/114.31

(58) Field of Classification Search
USPC ................ 73/114.31, 114.32, 114.33, 114.37
See application file for complete search history.

(56) References Cited

U.S. PATENT DOCUMENTS

| 5,604,306 | A | 2/1997 | Schricker |
| 5,606,311 | A | 2/1997 | Polidan et al. |
| 7,032,573 | B2 | 4/2006 | Ardisana |
| 7,444,234 | B2 * | 10/2008 | Bauerle .......................... 701/114 |
| 7,509,845 | B2 * | 3/2009 | Wiggins et al. ............. 73/114.31 |
| 7,635,402 | B2 * | 12/2009 | Hoffman ...................... 55/385.3 |
| 2003/0221480 | A1 * | 12/2003 | Aschner et al. ............... 73/118.1 |
| 2005/0240338 | A1 * | 10/2005 | Ardisana ....................... 701/114 |
| 2008/0183366 | A1 * | 7/2008 | Bauerle ......................... 701/103 |
| 2008/0190177 | A1 * | 8/2008 | Wiggins et al. ................ 73/49.7 |
| 2008/0229720 | A1 * | 9/2008 | Benscoter et al. .............. 55/290 |
| 2009/0025469 | A1 * | 1/2009 | Wang et al. ................ 73/114.37 |

FOREIGN PATENT DOCUMENTS

KR    10-1999-0041857    6/1999

OTHER PUBLICATIONS

International Search Report and Written Opinion mailed Sep. 16, 2009 (10 pgs.).
International Preliminary Report on Patentability mailed Nov. 4, 2010 (5 pgs.).

* cited by examiner

*Primary Examiner* — Eric S McCall
(74) *Attorney, Agent, or Firm* — Cantor Colburn LLP

(57) ABSTRACT

A sensor that is designed for determining ambient pressure for purposes of derating an internal combustion engine at high altitudes, is used to determine the condition of the air filter by taking pressure measurements in the intake manifold before and after the engine is started, with the difference then being an indication of the condition of the air filter.

6 Claims, 1 Drawing Sheet

METHOD FOR DETERMINING AIR FILTER CONDITION

TECHNICAL FIELD

This invention relates generally to transport refrigeration systems and, more particularly, to a method of using a manifold absolute pressure sensor to determine the condition of an engine air filter.

BACKGROUND OF THE INVENTION

In transport refrigeration systems, such as are used in truck trailers and refrigerated containers, a diesel engine is provided to drive certain components such as the compressor and the generator for the refrigeration system.

While operating in high altitude conditions, the inadequacy of air to the engine when more power is called for may cause the engine to stall. This problem is commonly addressed by the use of a manifold absolute pressure (MAP) sensor in the air intake system and using it to control the power required by the unit, which in turn would prevent the engine from stalling.

A separate, and unrelated problem is that of the intake air filter being clogged after extensive use. This problem has generally been addressed by the use of a so called "filter minder", which is a simple visual pressure indicator which shows when an air filter is plugged and needs to be cleaned or replaced.

DISCLOSURE OF THE INVENTION

In accordance with one aspect of the invention, the "filter minder" device can be eliminated by selective use of the MAP in such a way as to measure the air pressure in the air intake manifold before and after starting the engine in order to determine the condition of the filter.

DETAILED DESCRIPTION OF THE INVENTION

Figure 1:
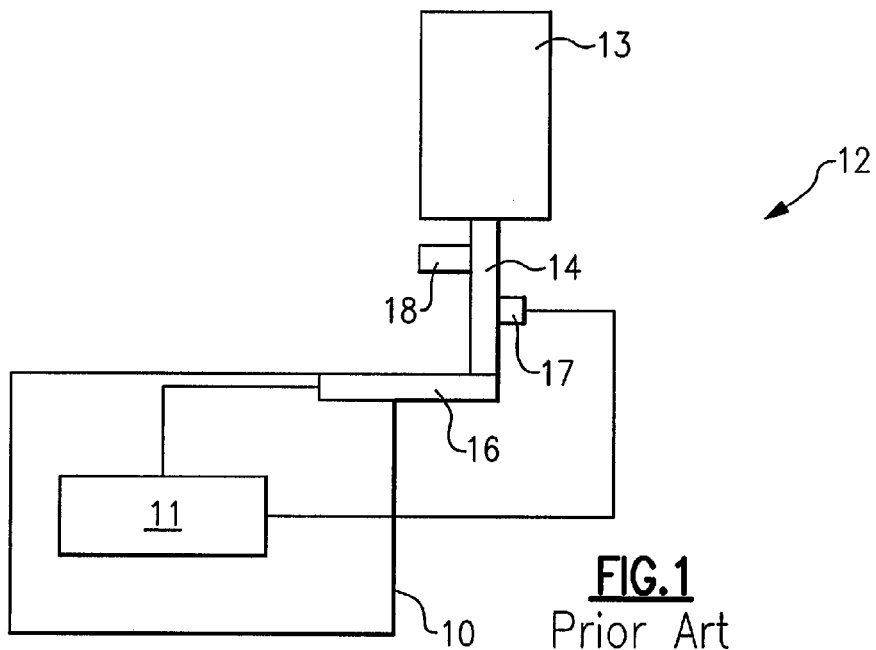
FIG. 1 is a schematic illustration of an engine and associated air system in accordance with the prior art.

FIG. 1 is a schematic illustration of an engine and its air intake system in accordance with the prior art. The engine 11 is typically a diesel engine for driving components of a self-contained refrigeration system of the type installed in a refrigerated truck trailer or a refrigerated container 10.

The air intake system 12 includes, in serial flow relationship, an air filter 13, an air intake manifold 14 and an air inlet hose 16 for delivering ambient air to the engine 11 for purposes of supporting combustion therein.

In order to accommodate operation of the engine 11 at high altitude conditions, a MAP (manifold absolute pressure) sensor 17 is provided in the air intake manifold 14. The sensor 17 determines the air pressure inside the intake manifold 14 and automatically controls the unit power requirement of the engine 11 if the pressure in the air intake manifold 14 indicates that there will not be sufficient air to properly support combustion when normal power demands are placed on the engine 11.

Separate and independent from the MAP sensor 17 is a filter minder sensor 18 which shows the pressure in the intake manifold 14 and provides a visual indication of that pressure to indicate to the observer whether the air filter 13 is plugged. That is, if it is plugged, the pressure in the intake manifold 14 will be below its normal level.

Figure 2:
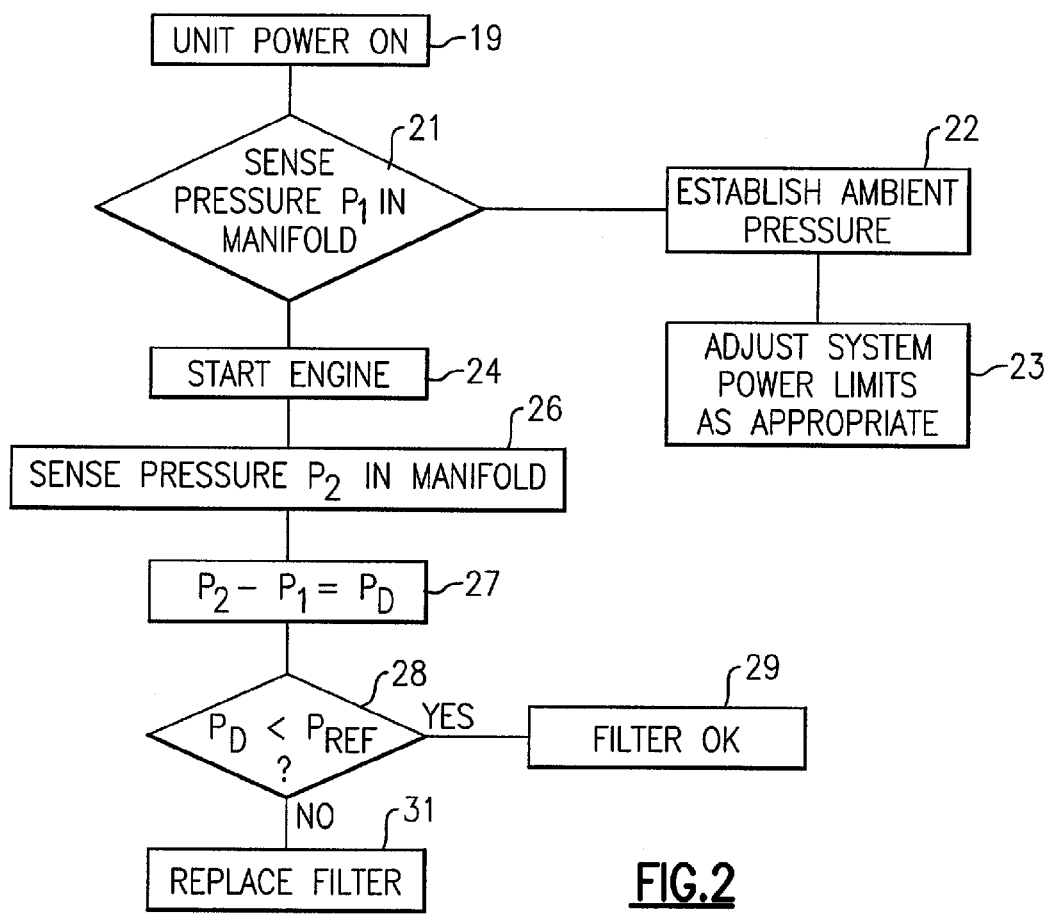
FIG. 2 is a flowchart indicating the method of determining a filter condition in accordance with the present invention.

In accordance with the present invention, the filter minder sensor 18 can be eliminated, and the MAP sensor 17 may be used in a unique way in order to perform the function of determining the condition of the air filter 13 in accordance with the method as shown in FIG. 2.

Before the engine 11 is started, the unit power is turned on as shown in block 19. The MAP sensor 17 then senses the pressure within the air intake manifold 14, and that pressure $P_1$ is recorded as shown in block 21. That pressure, which is indicative of the ambient pressure as indicated in block 22, is then applied to control unit power requirement of the engine 11 if the pressure is below a predetermined level as indicated in block 23. That concludes what is the normal function of the MAP sensor 17.

After the engine is started as shown in block 24, another MAP sensor pressure $P_2$ is taken within the air intake manifold 14 as shown in block 26. In block 27, the pressure $P_2$ is subtracted from the pressure $P_1$ to obtain a pressure difference $P_D$, and in block 28 the pressure difference $P_D$ is compared with a predetermined reference $P_{ref}$. If $P_D$ is determined to be less than $P_{ref}$, then the filter is determined to be acceptable as shown in block 29. If it is greater than $P_{ref}$, then the computer indicates that the filter should be replaced as shown in block 31.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A method of determining the condition of an air filter at the intake manifold of a diesel engine comprising:
    obtaining an initial pressure sensor reading before the engine is started;
    indicating an ambient pressure in response to the initial pressure sensor reading;
    applying the ambient pressure to a control unit to adjust engine power limits in response to the ambient pressure;
    after the engine is started obtaining a second pressure sensor reading;
    obtaining a difference between said initial and said second reading; and
    on the basis of said difference, determining the condition of the filter.

2. A method as set forth in claim 1 wherein said determining step includes comparing said difference with a predetermined reference value.

3. A method as set forth in claim 2 wherein if said difference is greater than said reference value, a determination is made that the filter should be replaced.

4. A method of using a manifold absolute pressure sensor, which is designed to control a diesel engine at higher altitudes, for determining the condition of an engine air filter comprising:
    using the pressure sensor to obtain an initial pressure reading in an intake manifold before the engine is started;
    indicating an ambient pressure in response to the initial pressure sensor reading;
    applying the ambient pressure to a control unit to adjust engine power limits in response to the ambient pressure;
    using the pressure sensor to obtain a second pressure reading in the intake manifold after the engine is started;

obtaining a difference between said initial and said second pressure readings; and determining the condition of the air filter on the basis of said difference.

5. A method as set forth in claim 4 wherein said determining includes comparing said difference with a predetermined reference value.

6. A method as set forth in claim 5 wherein if said difference is greater than said reference value, a determination is made that the filter should be replaced.

\* \* \* \* \*